April 2, 1963     C. A. DOAN ET AL     3,084,075
DIE CLEANING
Filed Aug. 18, 1960
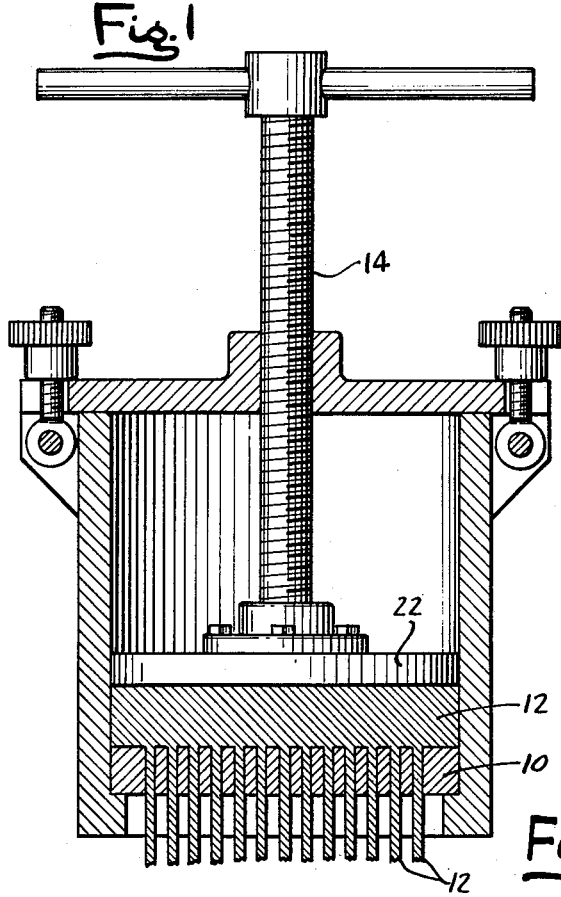
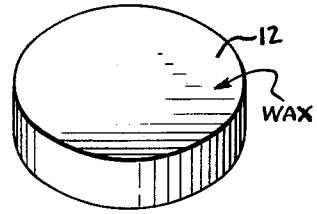
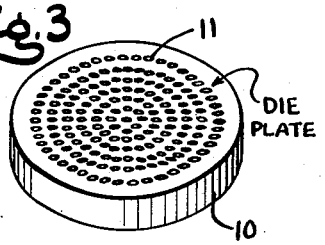
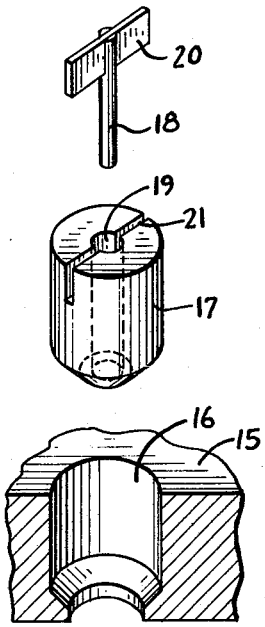
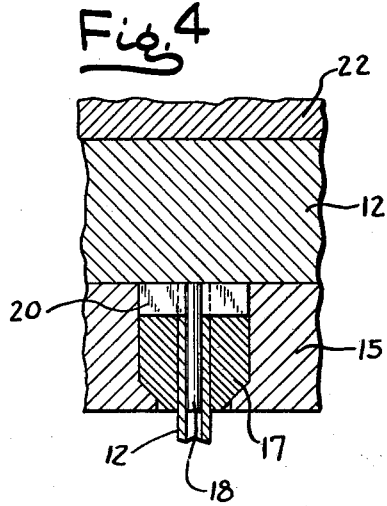
INVENTORS
CHARLES A. DOAN
RUSSELL J. HOFFMAN
WINFRED D. LEPLEY
by: *Gary, Desmond & Parker*
ATTYS United States Patent Office 3,084,075
Patented Apr. 2, 1963

3,084,075
DIE CLEANING
Charles A. Doan, Russell J. Hoffman, and Winfred D. Lepley, Battle Creek, Mich., assignors to Kellogg Company, Battle Creek, Mich., a corporation of Delaware
Filed Aug. 18, 1960, Ser. No. 50,409
2 Claims. (Cl. 134—8)

This invention relates to a novel method for the cleaning of dough extruding dies.

More particularly, the present invention relates to a method for cleaning the orifices of dies or die plugs which have been used for the extruding of dough products into shapes which may be of solid, transverse sections such as noodles, or of hollow sections such as macaroni, and similar transverse shapes used in the production of ready-to-eat breakfast cereals where dough is extruded and cut into short lengths upon extrusion to the form of letters such as K, O, and the like.

Such dies which are made of metal may, for example, be from less than one to more than two inches in thickness, and are usually of stainless steel or brass, or of steel with brass plugs, and other alloys. They require cleaning from time to time to remove accumulated dough particles, particularly when the extruding operation is terminated for a protracted period or when the dies are removed.

Accumulated dough residue (which term is herein understood to mean not only dough prepared from flour or flour mixtures and water, but also mixtures of ground or powdered cereals which have been precooked, together with modifying agents and water to form an extrudable mass of about 25% more or less moisture content), if allowed to stand and to become dry may adhere to the surfaces of the die orifices, with the result that the extruded shapes are not accurate and the extrusion becomes rough so that a spoilage occurs, particularly in shaped sections which have thin walls.

Further, the permitting of dough residue to remain for protracted periods in the die orifices can result in souring by production of acids which attack and cause pitting of the finely machined walls of the extrusion orifices, with resultant impairment of quality of the extruded product.

For the foregoing reasons and for good housekeeping purposes, it is desirable to prevent accumulation of dough residue in the dies and to clean them regularly.

Various procedures have been heretofore employed for cleaning dies such as overnight soaking to cause the dough in the die to become softened, and the use of higher pressure water jets in washing machines, all of which are time consuming and not entirely satisfactory. It is possible to clean dies with high pressure steam jets, but in the normally thick dies the high temperature steam tends to cook the dough inside the die and make it very difficult to remove.

It is therefore an object of the present invention to provide a novel method for rapidly and thoroughly cleaning the die orifices and to provide particularly effective means for cleaning those of compound shape.

In general, the objects of the present invention are accomplished by pressing or extruding through the die orifices normally solid waxy material which will thus remove the dough residue in a smooth, firm, and effective manner, the waxy material being of a character such that the resultant residues thereof left in the die can be readily removed by means of water heated to the temperature above that of the melting point of the wax.

Other objects and advantages of the present invention and the economies thereof will be apparent from a consideration of the following specification and the accompanying drawings, wherein:

FIG. 1 is a vertical section of an arbor press suitable for accomplishing the objects of the present invention.

FIG. 2 is a perspective view of a block of wax which can be used for extruding through the orifices of a die plate to be cleaned; and FIG. 3 is a perspective view of a simple die having a large number of cylindrically shaped orifices.

FIG. 4 is an enlarged, fragmentary, sectional view illustrating the process of the present invention in the cleaning of a die plug having an orifice of tubular character; and FIG. 5 is an exploded perspective view of a fragmentary portion of a die and its component plug portions of the nature shown in FIG. 4.

Referring to the drawings, FIG. 3 shows a conventional circular die plate 10 formed with a multitude of cylindrical orifices 11 such as is used in the formation of extruded dough materials such as spaghetti or ready-to-eat breakfast cereals. In the latter case the extruded pieces are cut to desirable lengths upon extrusion prior to further treatment.

In accordance with the present invention, cleaning is accomplished by pressing through the orifice of the die a body of wax 12 which may suitably be formed in the shape of a block approximately the diameter of the die plate 10 and a thickness or total volume such that it will more than completely fill the die orifices and thus be adequate to carry outwardly from the die orifices any collected dough residues lodged therein. As previously indicated, the waxy material 12 should be solid at normal room or ambient temperature and should be meltable in hot water at temperatures preferably above about 140° F.

The term "waxy material" as employed in the present specification and claims includes natural and synthetic waxes which are of a nontoxic character or which do not leave any toxic residues and which can be of vegetable, animal, or mineral origin, such as, for example, paraffin wax, microcrystalline wax, and other waxes of petroleum origin; carnauba wax, candelilla wax, refined beeswax, and others of vegetable or animal origin; and synthetic waxy materials such as hydrogenated cotton seed, lard, and olive oil, or mixtures of such waxy materials which are solid at ambient temperature, and which melt in hot water as indicated.

Extrusion of the waxy material through the die for cleaning thereof can be accomplished by means of suitable apparatus, such as by means of the extruder to which the die plate is normally attached, or conveniently in a separate hydraulic or arbor press.

Thus, FIG. 1 diagrammatically illustrates the employment of an arbor press generally designated as 13 wherein the die plate 10 to be cleaned is mounted and wherein a preshaped cylindrical wax body 12 is disposed above the die and caused to be pressed therethrough by manipulation of the screw 14 to thereby dislodge from position accumulated dough residues and remove and carry them outwardly of the die.

Thereafter the die plate 10 with adherent accumulation of wax 12 thereon and therein can be cleaned for removal of the wax by simply washing the die plate 10 with water at a temperature of 210° F. adequate to melt out the remaining wax and to thereby leave the die free of both dough and waxy residues.

FIG. 5 shows a die plug such as is used in the formation of tubular material such as lengths of macaroni, or which length may be cut off as extruded to form O or ring-shaped pieces. As is well known, this comprises the die plate 15 having an aperture 16 for receiving the die plug 17, the latter being adapted to receive the cylindrical pin 18 within its hollow 19, the pin 18 being of smaller diameter than that of the hollow 19. The pin 18 is held in position by means of its head portion 20 receivable in the plug slots 21. Die plugs of this type can of course be also readily cleaned by forcing a body of wax 12 therethrough by means of the ram 22 of a press, as shown in FIG. 4, and in a manner similar to that illustrated in the arrangement of the apparatus shown in FIG. 1.

It will thus be apparent that the present invention provides a rapid, effective, and economical manner for cleaning dough extruding dies, and although we have shown and described the preferred embodiment and means for accomplishing the objects of our invention, it will be understood that other means may be employed for accomplishing our objects and advantages, as will be apparent to those skilled in the art.

We claim:

1. The method of cleaning the orifices of a dough-extruding die to remove adhered dough residue therefrom, which comprises extruding through said die solid waxy material, said waxy material being solid at normal room temperature and liquefiable in hot water, then washing the die in hot water at a temperature above the melting point of the waxy material to free the die of waxy material residue.

2. The method of cleaning the orifices of a dough-extruding die to remove adherent dough residue therefrom, which comprises extruding through said die orifices nontoxic solid waxy material whereby to remove adherent dough residue from the die orifices, said waxy material having a melting point above about 140° F. and melting in hot water, and then removing residual adherent waxy material from said die by washing it in water heated to at least the melting point of the waxy material.

References Cited in the file of this patent

UNITED STATES PATENTS

| | | |
|---|---|---|
| 2,216,188 | Dons | Oct. 1, 1940 |
| 2,245,640 | Beattie | June 17, 1941 |
| 2,346,228 | Merrill | Apr. 11, 1944 |
| 2,708,447 | Longan | May 17, 1955 |
| 2,876,842 | McSpadden | Mar. 10, 1959 |